(12) United States Patent
Yang

(10) Patent No.: US 8,314,751 B2
(45) Date of Patent: Nov. 20, 2012

(54) DUAL-DISPLAY ELECTRONIC DEVICE

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 400 days.

(21) Appl. No.: 12/827,024

(22) Filed: Jun. 30, 2010

(65) Prior Publication Data

US 2011/0157036 A1   Jun. 30, 2011

(30) Foreign Application Priority Data

Dec. 28, 2009   (CN) .......................... 2009 1 0312419

(51) Int. Cl.
*G09G 5/00* (2006.01)

(52) U.S. Cl. .......... 345/1.1; 345/173; 345/156; 345/3.1; 345/2.1; 345/5

(58) Field of Classification Search .................. None
See application file for complete search history.

(56) References Cited

U.S. PATENT DOCUMENTS

| | | | | |
|---|---|---|---|---|
| 5,847,698 | A * | 12/1998 | Reavey et al. | 345/173 |
| 7,748,634 | B1 * | 7/2010 | Zehr et al. | 235/492 |
| 8,233,863 | B2 * | 7/2012 | Kim | 455/158.4 |
| 2002/0149541 | A1 * | 10/2002 | Shin | 345/3.1 |
| 2002/0158812 | A1 * | 10/2002 | Pallakoff | 345/5 |
| 2003/0011534 | A1 * | 1/2003 | Rengan et al. | 345/1.1 |
| 2007/0118671 | A1 * | 5/2007 | Ganti | 710/1 |
| 2007/0182663 | A1 * | 8/2007 | Biech | 345/1.1 |
| 2007/0270198 | A1 * | 11/2007 | Maatta | 455/575.3 |
| 2008/0068292 | A1 | 3/2008 | Yuan et al. | |
| 2008/0072163 | A1 * | 3/2008 | Teng et al. | 715/761 |

FOREIGN PATENT DOCUMENTS

CN   101076041 A   11/2007

* cited by examiner

*Primary Examiner* — Van Chow
(74) *Attorney, Agent, or Firm* — Altis Law Group, Inc.

(57) ABSTRACT

A dual-display electronic device includes a housing, a first type of display panel mounted on the housing, and a second type of display unit received in the housing. The housing defines a receiving space therein and an opening communicating with the receiving space. The second type of display unit is slidably received in the receiving space and includes an second type of display panel. A first magnet is mounted on the second type of display unit, a second magnet and an electromagnet are mounted on the housing respectively. When the electromagnet is powered off, the second magnet attracts the first magnet to keep the second type of display panel hiding in the receiving space. When the electromagnet is powered on, the electromagnet attracts the first magnet to make the second type of display panel slide out of the receiving space.

9 Claims, 5 Drawing Sheets

DUAL-DISPLAY ELECTRONIC DEVICE

BACKGROUND

1. Technical Field

The present disclosure relates to dual-display electronic devices and, particularly, to a dual-display electronic device with one display panel being concealable.

2. Description of Related Art

Electronic devices, such as electronic books, usually employ electronic papers (e-paper) or liquid crystal displays (LCD) as their display unit. The e-papers and the LCDs respectively have their own advantages. The e-papers are power saving and have good reading performance. The LCDs can show more colors and have higher refresh rate.

Thus, it would be desirable to have a dual-display electronic device employing different display units.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
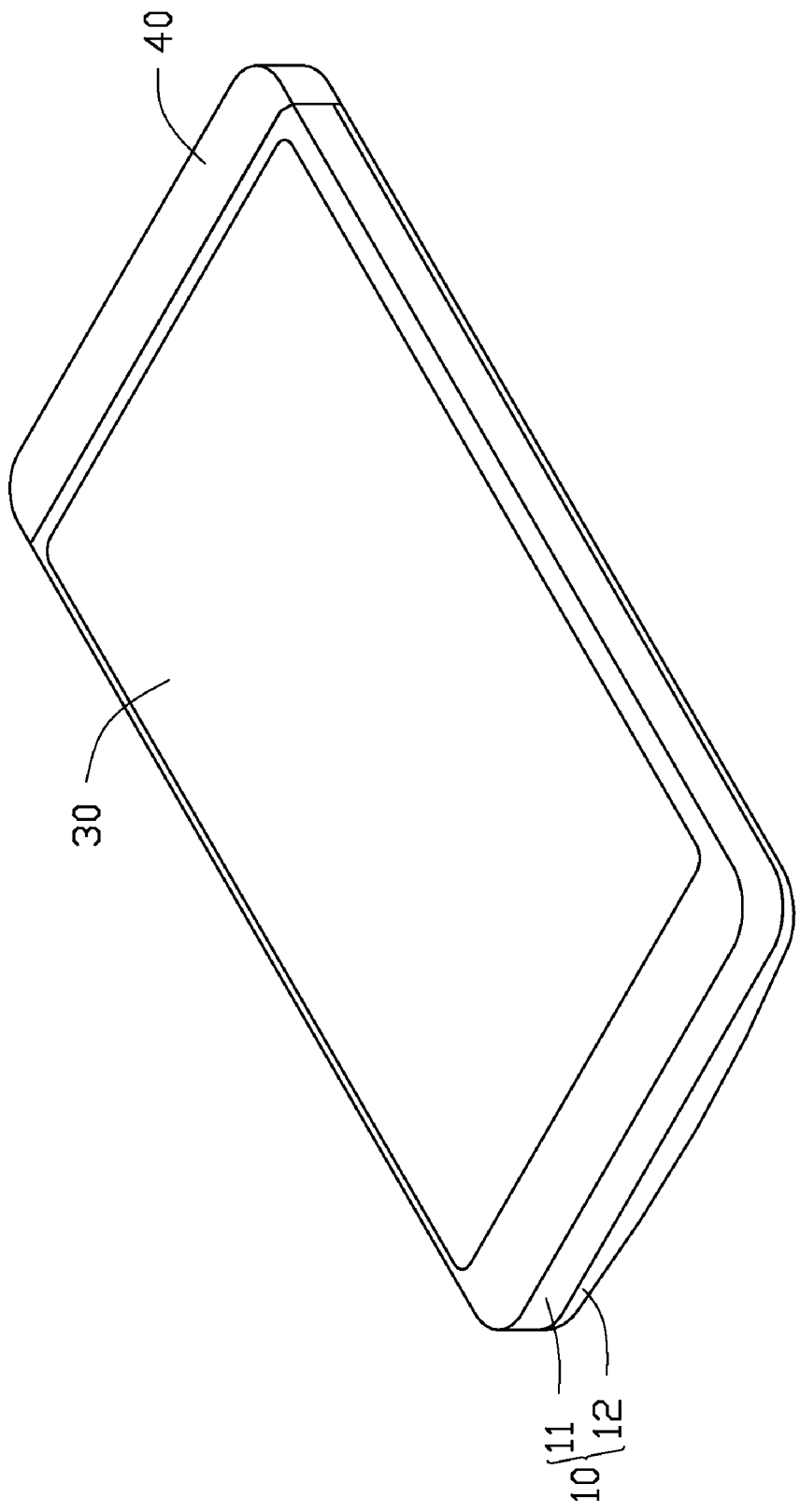
FIG. 1 is a schematic, isometric view of a dual-display electronic device in a closed state according to an exemplary embodiment.
Figure 2:
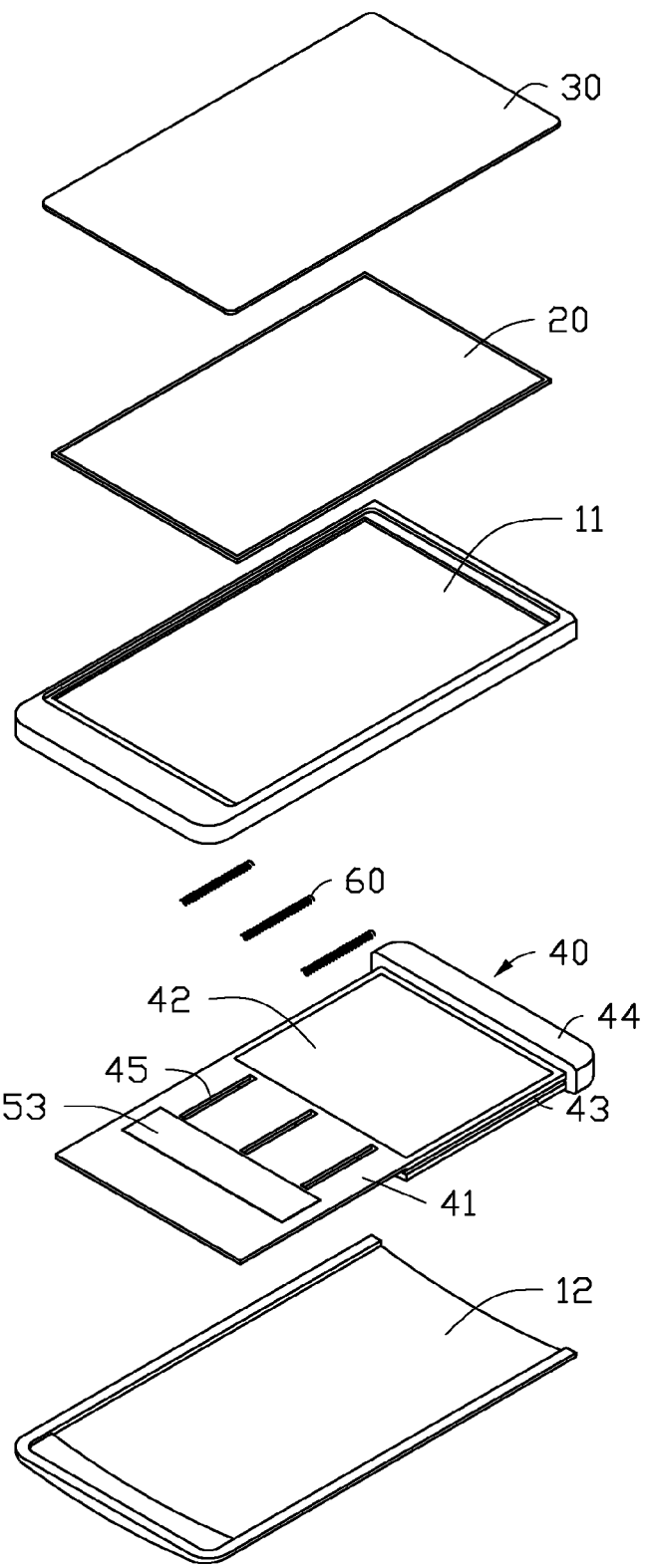
FIG. 2 is an exploded view of FIG. 1.

Referring to FIGS. 1-2, a dual-display electronic device according to an exemplary embodiment is disclosed. The electronic device includes a housing 10, an e-paper panel 20 mounted on the outer surface of the housing 10, a touch unit 30 mounted on the e-paper panel 20, and an LCD unit 40 mounted in the housing 10.

Figure 5:
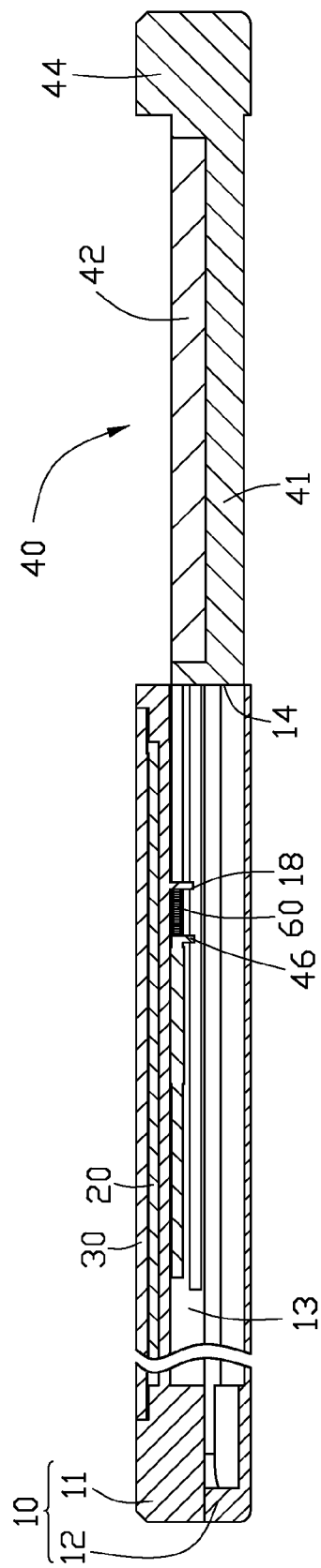
FIG. 5 is a cross-sectional view taken along line V-V of FIG. 4.

The housing 10 includes an upper housing 11 and a bottom housing 12. The e-paper panel 20 and the touch unit 30 are mounted on the upper housing 11. Referring also to FIG. 5, the upper housing 11 and the bottom housing 12 cooperate to form a receiving space 13 for receiving the LCD unit 40. The housing 10 defines an opening 14 communicated with the receiving space 13 at an end thereof. The LCD unit 40 is able to slide out of and into the housing 10 from the opening 14.

Figure 3:
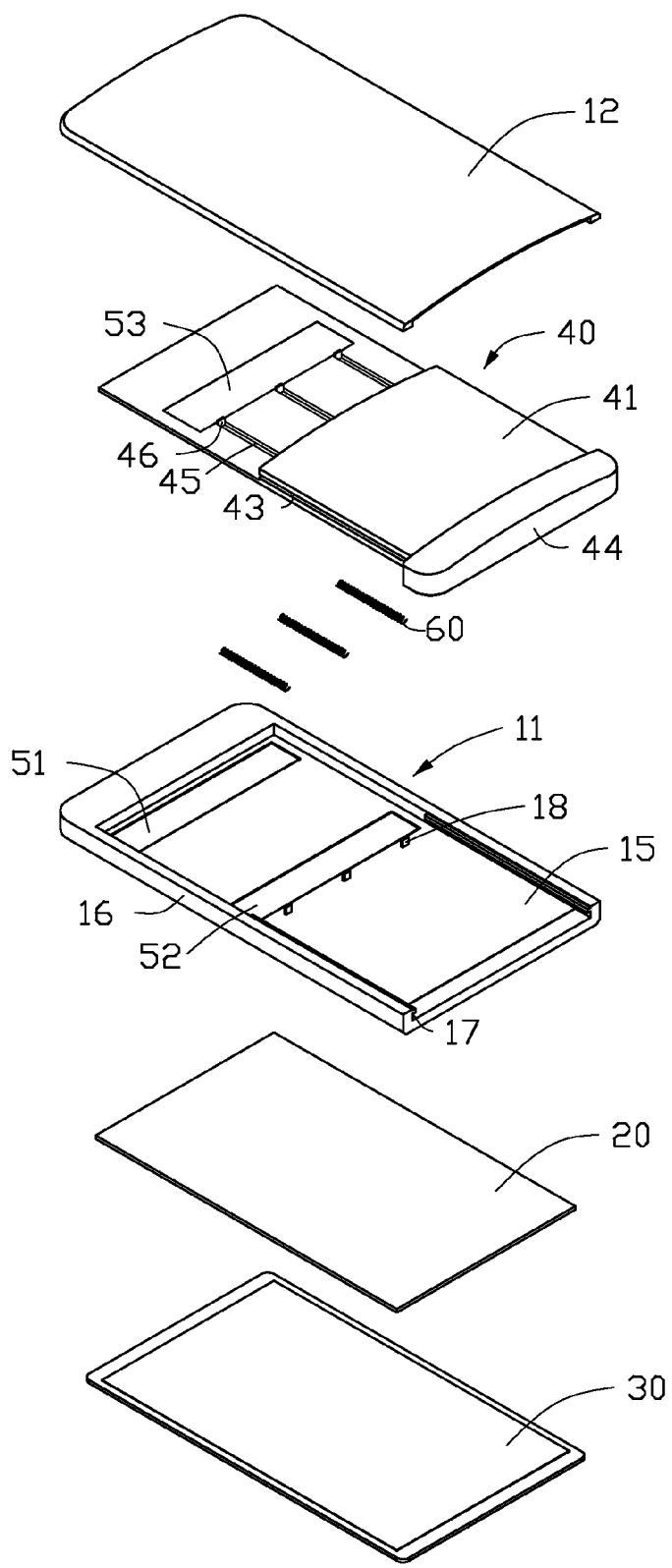
FIG. 3 is another exploded view of FIG. 1 viewed from a different aspect.

The LCD unit 40 includes a frame 41 and an LCD panel 42 mounted on a first surface of the frame 41. The first surface of the frame 41 faces the e-paper panel 20. The frame 41 includes a projected covering end 44 capable of covering the opening 14. A permanent magnet 53 is mounted on the frame 41 far away from the covering end 44. Sliding grooves 43 are defined in opposite sidewalls of the frame 41, and a plurality of receiving grooves 45 are also defined in the frame 41 between the LCD panel 42 and the permanent magnet 53. The sliding grooves 43 and the receiving grooves 45 are parallel to each other. Referring also to FIG. 3, pins 46 are mounted in the ends of the receiving grooves 45 adjacent to the permanent magnet 53.

The upper housing 11 includes an upper wall 15 and side walls 16 extending perpendicularly from two opposite sides of the upper wall 15. Rails 17 are extended towards each other from the two opposite side walls 16. A plurality of pins 18 is located on a first surface of the upper wall 15 towards the opening 14 of the housing 10. The electronic device further includes a permanent magnet 51 mounted on an end of the upper housing 11 far away from the opening 14, and an electromagnet 52 mounted on the other end of the upper housing 11 adjacent to the plurality of pins 18. The magnetic force of the electromagnet 52 is greater than the magnetic force of the permanent magnet 51.

The rails 17 are slidably received in the sliding grooves 43, thus the LCD unit 40 is able to slide along the rails 17 relative to the upper housing 11. The covering end 44 is configured for covering the opening 14 when the LCD unit 40 slides in the receiving space 13 of the housing 10. The pins 18 of the upper housing 11 are inserted into the receiving grooves 45 and slide along the receiving grooves 45. Elastic pieces 60 are received in the receiving grooves 45, two ends of the elastic pieces 60 are fixed on the pins 18, 46 respectively. The elastic pieces 60 are configured for providing elastic forces when the LCD unit 40 slides relative to the housing 10, thus to avoid impacts between the LCD unit 40 and the housing 10.

Referring to FIG. 1, which shows the LCD panel 42 is hidden in the receiving space 13, and the electronic magnet 52 is powered off. Referring also to FIG. 5, as the electronic magnet 52 releases the permanent magnet 53, the permanent magnet 51 attracts the permanent magnet 53 to keep the LCD unit 40 in the receiving space 13 of the housing 10.

Figure 4:
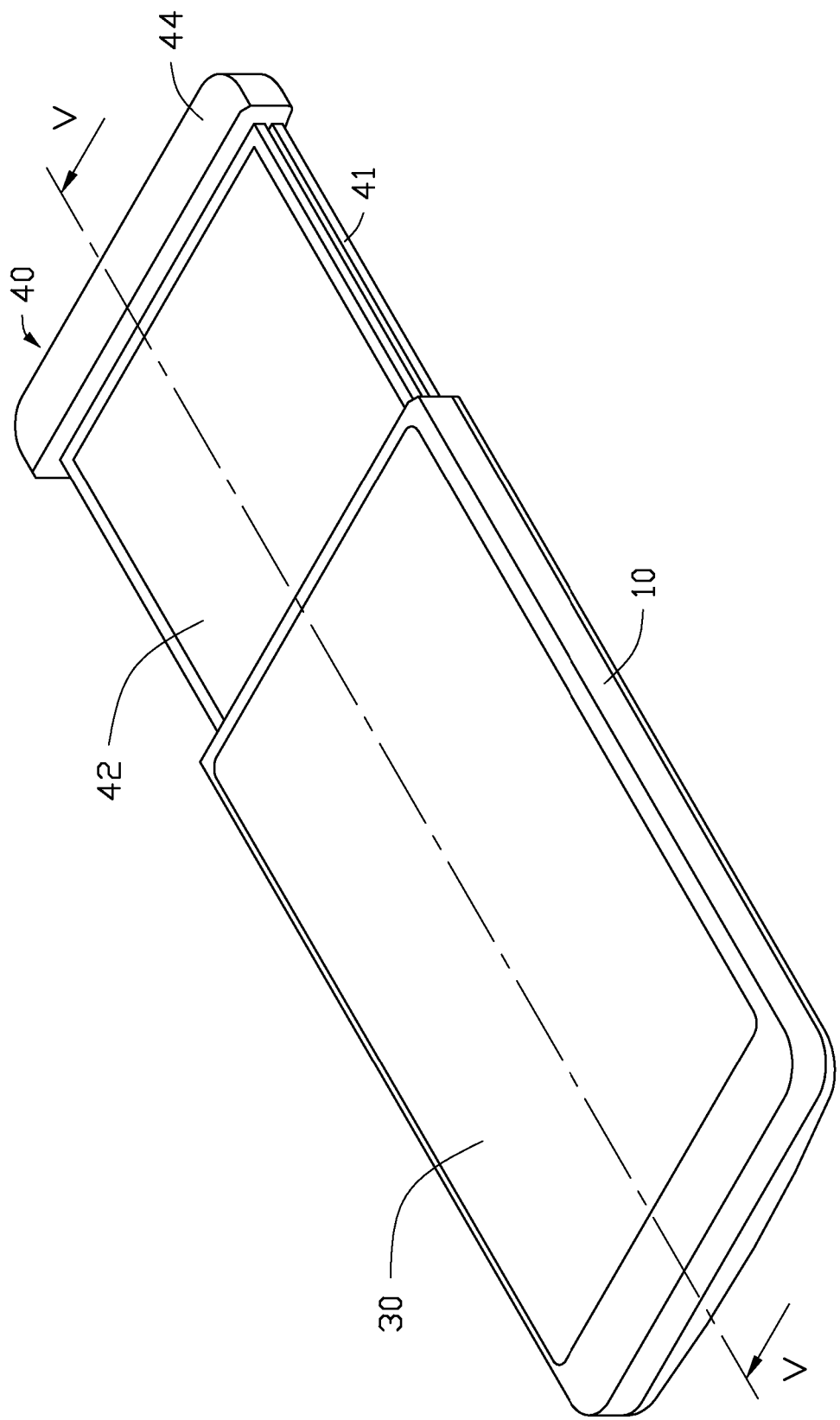
FIG. 4 is a schematic, isometric view of the dual-display electronic device of FIG. 1 in an opened state.

As shown in FIG. 4, when a user wants to watch a picture or a video on the LCD panel 42, the user can operate to power on the electric magnet 52, the electric magnet 52 attracts the permanent magnet 53 to make the LCD panel 42 slide out from the housing 10 for viewing by the user.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A dual-display electronic device comprising:
    a housing defining a receiving space therein, and an opening communicating with the receiving space on an end thereof;
    a first type of display panel mounted on the housing;
    a second type of display unit slidably received in the receiving space, comprising a second type of display panel;
    a first magnet mounted on the second type of display unit; and
    a second magnet and an electromagnet mounted on the housing;
    wherein when the electromagnet is powered off, the second magnet attracts the first magnet to pull the second type of display panel in the receiving space; when the electromagnet is powered on, the electromagnet attracts the first magnet to pull the second type of display panel out of the receiving space.

2. The dual-display electronic device of claim 1, further comprising elastic pieces connecting the second type of display unit to the housing.

3. The dual-display electronic device of claim 1, wherein the second type of display unit further comprises a frame for carrying the second type of display panel.

4. The dual-display electronic device of claim 3, wherein the housing forms rails, and the frame defines sliding grooves for receiving the rails.

5. The dual-display electronic device of claim 3, wherein the frame comprises a covering end for covering the opening when the second type of display panel is received in the receiving space.

6. The dual-display electronic device of claim 3, wherein the frame further defines receiving grooves for receiving the elastic pieces.

7. The dual-display electronic device of claim 1, further comprising a touch unit mounted on the first type of display panel.

8. The dual-display electronic device of claim 1, wherein the housing comprises an upper housing and a bottom housing which cooperate to form the receiving space.

9. The dual-display electronic device of claim 1, wherein the first type of display panel is an e-paper panel, the second type of display panel is an LCD panel.

* * * * *